United States Patent
Schulte et al.

(10) Patent No.: US 9,421,703 B2
(45) Date of Patent: Aug. 23, 2016

(54) PANELS AND PROCESSES THEREFOR

(75) Inventors: Michael Dominic Schulte, Montgomery, OH (US); Eric Joseph Aho, Cincinnati, OH (US); Peter Kennedy Davis, Niskayuna, NY (US); Wendy Wen-Ling Lin, Niskayuna, NY (US); Michael Joseph O'Brien, Clifton Park, NY (US); Brian Dominic Stephens, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1072 days.

(21) Appl. No.: 13/334,616

(22) Filed: Dec. 22, 2011

(65) Prior Publication Data

US 2013/0042475 A1   Feb. 21, 2013

Related U.S. Application Data

(60) Provisional application No. 61/524,218, filed on Aug. 16, 2011.

(51) Int. Cl.
  *B29C 44/04*   (2006.01)
  *B29C 44/08*   (2006.01)
  (Continued)

(52) U.S. Cl.
  CPC ............. *B29C 44/0446* (2013.01); *B29C 44/08* (2013.01); *B29C 44/3484* (2013.01);
  (Continued)

(58) Field of Classification Search
  CPC .............. Y10T 29/4932; Y02T 50/672; B29C 44/0446; B29C 47/0042; B29C 47/004; B29C 44/3484; B29C 44/08; B29C 44/50; B29C 47/0019
  See application file for complete search history.

(56) References Cited

U.S. PATENT DOCUMENTS

| 4,478,552 A | 10/1984 | Thompson |
| 5,234,757 A | 8/1993 | Wong |

(Continued)

FOREIGN PATENT DOCUMENTS

| EP | 2202264 A1 | 6/2010 |
| JP | 4135829 | 5/1992 |

(Continued)

OTHER PUBLICATIONS

Unofficial English translation of Office Action issued in connection with corresponding CN Application No. 201280039753.2 on Sep. 11, 2015.

(Continued)

*Primary Examiner* — Richard Chang
(74) *Attorney, Agent, or Firm* — General Electric Company; William Scott Andes

(57) ABSTRACT

Polymer-based materials and processes suitable for producing panels, for example, panels for use in a fan shroud abradable seal of a turbofan engine. Such a process includes introducing constituents of an expandable foam material into a continuous forming apparatus that continuously compounds the constituents into a partially-cured compounded polymeric material, which is then continuously formed with the continuous forming apparatus to produce a continuous form having a constant cross-sectional shape transverse to a continuous forming direction of the continuous forming apparatus. A portion of the continuous form is then deformed to produce a preform, and the preform is cured within a restricted volume to cause the preform to expand and produce the panel.

18 Claims, 4 Drawing Sheets

(51) Int. Cl.
*B29C 44/34* (2006.01)
*B29C 44/50* (2006.01)
*F01D 11/12* (2006.01)
*F02K 3/06* (2006.01)
*B29C 47/00* (2006.01)
*B29B 11/10* (2006.01)

(52) U.S. Cl.
CPC ............... *B29C44/50* (2013.01); *B29C 47/004* (2013.01); *B29C 47/0042* (2013.01); *F01D 11/122* (2013.01); *F01D 11/125* (2013.01); *F02K 3/06* (2013.01); *B29B 11/10* (2013.01); *B29C 47/0019* (2013.01); *F05B 2280/4007* (2013.01); *F05C 2225/08* (2013.01); *F05D 2230/23* (2013.01); *Y02T 50/672* (2013.01); *Y10T 29/4932* (2015.01)

(56) References Cited

U.S. PATENT DOCUMENTS

| | | | |
|---|---|---|---|
| 5,388,959 A | 2/1995 | Forrester et al. | |
| 5,397,611 A | 3/1995 | Wong | |
| 5,401,154 A * | 3/1995 | Sargent | 425/114 |
| 5,540,963 A | 7/1996 | Wong | |
| 5,660,901 A | 8/1997 | Wong | |
| 5,665,295 A * | 9/1997 | Takamoto et al. | 264/172.19 |
| 5,783,272 A | 7/1998 | Wong | |
| 8,491,258 B2 | 7/2013 | Schuster | |
| 2002/0012771 A1 | 1/2002 | Fiorinelli et al. | |
| 2003/0052430 A1 | 3/2003 | Hashiba | |
| 2006/0157886 A1 | 7/2006 | St. Denis et al. | |
| 2011/0045278 A1 | 2/2011 | Kuriu et al. | |

FOREIGN PATENT DOCUMENTS

| | | |
|---|---|---|
| JP | 10100182 A | 4/1998 |
| JP | 2001018225 A | 1/2001 |
| JP | 2011042731 A | 3/2011 |

OTHER PUBLICATIONS

Office Action issued in connection with corresponding JP Application No. 2014526061 on Apr. 26, 2016.

Office Action issued in connection with corresponding CN Application No. 201280039753.2 on May 11, 2016.

* cited by examiner

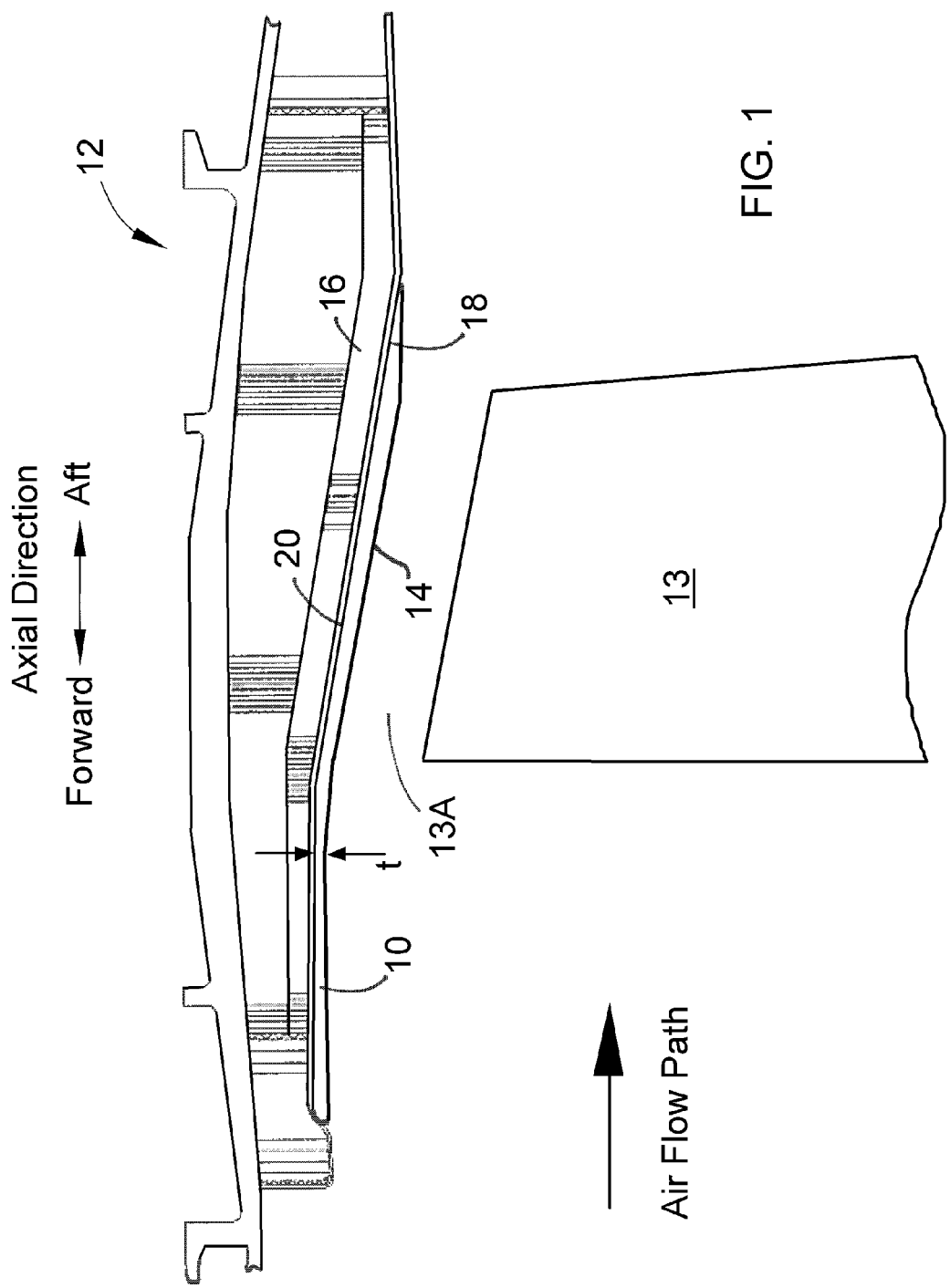

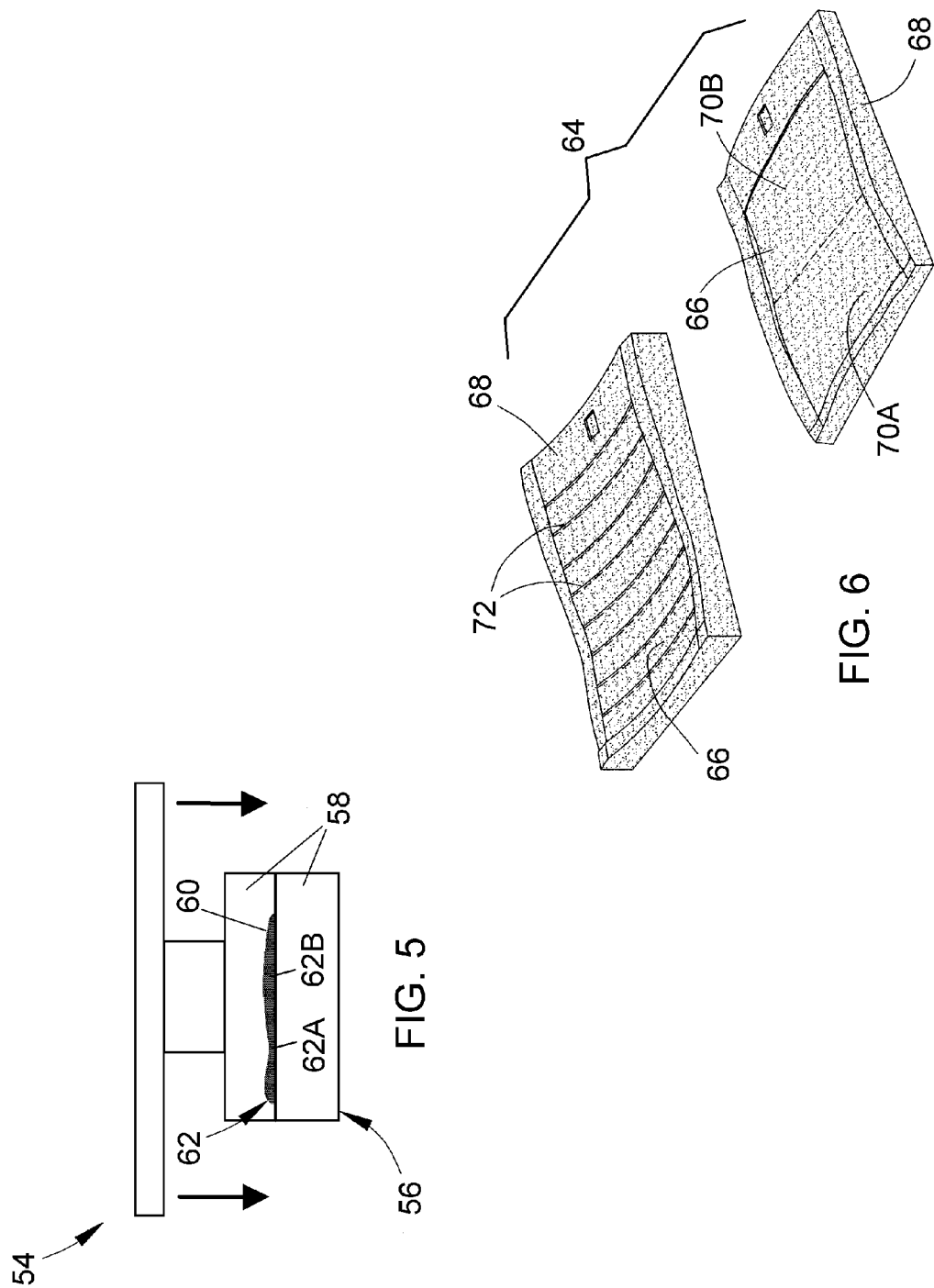

PANELS AND PROCESSES THEREFOR

CROSS REFERENCE TO RELATED APPLICATIONS

This application claims the benefit of U.S. Provisional Application No. 61/524,218, filed Aug. 16, 2011, the contents of which are incorporated herein by reference.

BACKGROUND OF THE INVENTION

The present invention generally relates to composite materials and processes suitable for producing components from composite materials. More particularly, this invention relates to materials and processes by which constituents of such materials can undergo compounding and forming to produce preforms that can be cured to produce, for example, panels suitable for use in an abradable seal in the fan section of a gas turbine engine.

Gas turbine engines generally operate on the principle of compressing air within a compressor section of the engine, and then delivering the compressed air to a combustor section of the engine where fuel is added to the air and the resulting air/fuel mixture is ignited. Afterwards, the resulting combustion gases are delivered to a turbine section of the engine, where a portion of the energy generated by the combustion process is extracted by a turbine rotor to drive the compressor section of the engine.

Turbofan engines have a fan at the front of the engine that compresses incoming air. A portion of the compressed air is delivered to the combustor section through the compressor section, while the remainder bypasses the compressor and combustion sections and instead is delivered via a bypass duct to the rear of the engine, where the bypassed air exits through a fan exit nozzle to produce additional thrust. In high bypass turbofan engines of types widely used in large aircraft operating at subsonic speeds, including those used by commercial airlines, the fan is relatively large and a larger portion of the compressed air flows through the bypass duct to produce most of the thrust generated by the engine. Accordingly, the operation of the fan has a significant impact on the thrust and specific fuel consumption (SFC) of high bypass turbofan engines. Reductions in SFC are important to airlines for the purpose of reducing airline operating costs.

In most turbofan engines, the fan is contained by a fan case that is equipped with a shroud. The shroud circumscribes the fan and is immediately adjacent the tips of the fan blades, such that the shroud serves to channel incoming air through the fan so that most of the air entering the engine will be compressed by the fan. However, a small portion of the incoming air is able to bypass the fan blades through a radial gap present between the tips of the fan blades and the shroud. In aircraft turbofan engines and particularly high bypass turbofan engines, SFC can be significantly affected by limiting the amount of air that bypasses the fan blades through this gap.

During the normal operation of an aircraft turbofan engine, the tips of the fan blades are very likely to rub the shroud. Rubbing contact between the fan blade tips and shroud tends to increase the radial gap between the shroud and the fan blade tips, thereby reducing engine efficiency. To mitigate damage to the blade tips from rub encounters, the portion of the shroud adjacent the fan blade tips is often covered with an abradable material capable of sacrificially abrading away when rubbed by the blade tips. The abradable material is often provided in the form of arcuate panels or sectors that are mounted to the shroud to define a continuous abradable seal that circumscribes the fan blades. Common abradable materials for use in fan sections of turbofan engines contain an expandable material that, during processing to form the abradable material, is expanded to have a substantially constant cross-sectional thickness ("radial thickness"). As described in U.S. Pat. No. 5,388,959, known abradable materials include polymer-based materials, and particularly low-density syntactic foam materials that contain an epoxy resin, micro-balloons, and a reinforcement material, for example, chopped polymeric fibers.

The fan section, shroud and abradable panels are manufactured to achieve tolerances that minimize the initial radial gap between the fan blade tips and the surface of the abradable seal formed by the abradable panels. In some instances, these tolerances are intended to avoid any significant rubbing between the blade tips and abradable material. For example, minimal radial gaps may be achieved by reducing variations in the lengths of the fan blades, the radial location of the fan disk, or the fan case diameter. The inner surfaces of the abradable panels must typically be machined to achieve the diametrical dimensions required for the shroud assembly, particularly if the abradable material is of the type described above that expands during curing.

In additional to diametrical tolerances, to maintain desirable aerodynamic efficiencies associated with a small radial gap, abradable panels are often formed to achieve a desirable flowpath geometry through the creation of a surface contour that closely matches the contour of the fan blade tips. As an example, each abradable panel may be formed to have an axial profile so that when assembled within the shroud, the diameter defined by the radially inward surfaces of the panels immediately surrounding the fan blades decreases in the aft direction of the engine. However, if the abradable material is formed from an expandable foam material of a type described above, such that the abradable material initially has a substantially constant cross-sectional thickness, grinding or other suitable machining operations must be performed to produce the desired surface profile on the surfaces of the abradable panels. Inherently, this operation generates scrap material, increases raw materials cost, and increases labor costs. Another drawback of conventional expandable foam materials is that the expansion process typically creates a generally constant density throughout the abradable material, which may not be necessarily desirable for abradable panels used in the fan section of a turbofan engine.

Durability is also a consideration for abradable seals in fan sections of turbofan engines. In particular, regions of an abradable seal located upstream of the fan blades are more susceptible to direct impingement from particles entering the engine. While a low density material is typically desirable for the region of an abradable seal most likely to be rubbed by the fan blades, higher densities forward of the blades can have the desirable effect of improving erosion resistance.

In view of the above, it should be appreciated that improved performance of abradable panels for fan blade shrouds is constantly sought to improve the SFC of turbofan engines. However, an ongoing challenge is the ability to achieve such improvements with abradable panels whose geometries must be consistently producible to have relatively complex axial profiles.

BRIEF DESCRIPTION OF THE INVENTION

The present invention provides polymer-based materials suitable for use as a fan shroud abradable seal, and processes capable of producing abradable seals from the materials.

According to a first aspect of the invention, a process is provided that includes introducing constituents of an expandable foam material into a continuous forming apparatus that continuously compounds the constituents into a partially-cured compounded polymeric material. The partially-cured compounded polymeric material is continuously formed with the continuous forming apparatus to produce a continuous form having a constant cross-sectional shape transverse to a continuous forming direction of the continuous forming apparatus. A portion of the continuous form is then deformed to produce a preform, and the preform is cured within a restricted volume to cause the preform to expand and produce the panel.

According to a second aspect of the invention, a process is provided for producing abradable panels adapted to be assembled together to form an abradable seal in a fan section of a turbofan engine. The process includes introducing constituents of an expandable foam material into an extrusion apparatus that continuously compounds the constituents into a partially-cured compounded polymeric material, which is continuously formed with the extrusion apparatus to produce a continuous form having a constant cross-sectional shape transverse to a continuous forming direction of the extrusion apparatus. A portion of the continuous form is deformed to produce a preform that has a different cross-sectional shape than the continuous form, and then the preform is cured within a restricted volume to cause the preform to expand and produce the panel. The restricted volume causes at least two zones of the panel to have different densities.

Other aspects of the invention include panels produced by processes comprising the steps described above.

A technical effect of the invention is the ability to consistently produce panels, including abradable panels, having a desired geometric shape, including complex geometric shapes within nonuniform thicknesses. The invention also provides the ability to produce panels with complex geometric shapes having desirable densities and density gradients.

Other aspects and advantages of this invention will be better appreciated from the following detailed description.

BRIEF DESCRIPTION OF THE DRAWINGS

FIG. 1 is a cross-sectional view of an abradable panel installed in a fan section of a turbofan engine.

FIG. 5 schematically represents tooling suitable for producing preforms by shaping continuous forms produced with the extrusion apparatus of FIG. 4.

FIG. 6 schematically represents tooling suitable for curing the preform produced by the tooling of FIG. 5 to produce the panel of FIGS. 1 and 2.

DETAILED DESCRIPTION OF THE INVENTION

Figure 2:
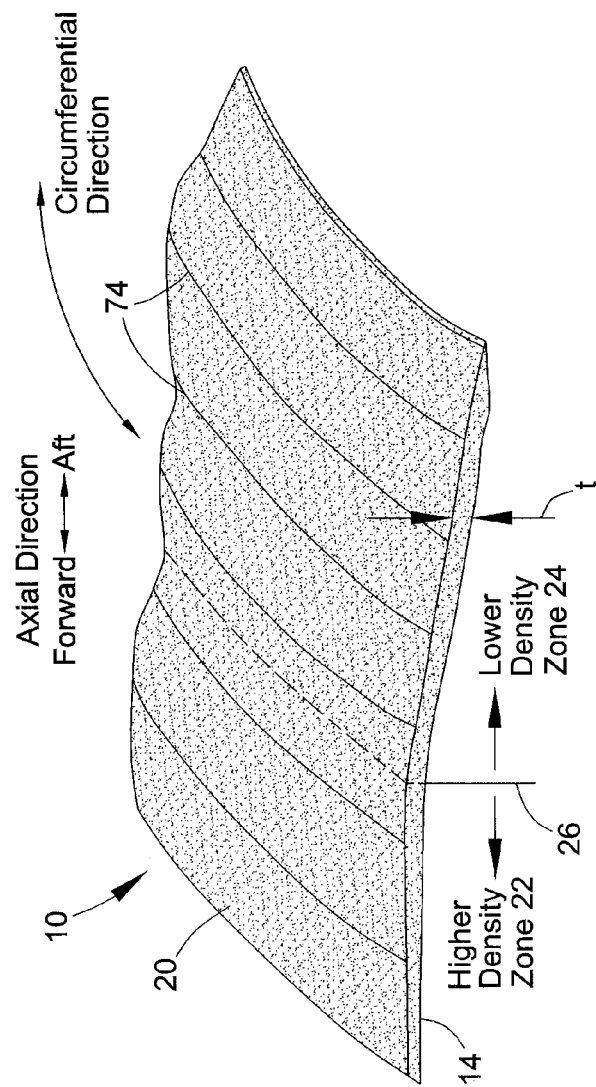
FIG. 2 is a perspective view of the abradable panel represented in FIG. 1.

FIGS. 1 and 2 schematically represent an abradable panel 10 of a type that can be used in a turbofan engine, including a high bypass turbofan aircraft engine. Abradable panels of this invention are not limited to the configuration represented in FIGS. 1 and 2. From the following discussion, it should also become apparent that materials and processes of this invention are not limited to the fabrication of abradable panels, and that other applications for the materials and processes are within the scope of the invention.

As represented in FIG. 1, the panel 10 is part of a shroud assembly 12 that circumscribes rotatable blades 13 (of which a fragment of one blade is represented) within a fan section of a turbofan aircraft engine. As known in the art, the panel 10 may be one of a series of panels (sectors) that, when mounted with the shroud assembly 12, define a continuous abradable seal adapted to minimize the radial gap 13A with the tips of the fan blades 13 (the radial gap 13A is exaggerated for purposes of illustration). As such, the panel 10 has an arcuate shape in the circumferential direction indicated in FIG. 2, so that when the panel 10 is assembled with other panels a continuous annular-shaped abradable seal can be constructed. As also evident from FIG. 1, the abradable panel 10 has a profiled surface 14 that defines an outer boundary of the air flow path through the fan section. The panel 10 is represented as being bonded to a support structure 16 along a bond line 18 located at a surface 20 of the panel 10 opposite the profiled surface 14. As seen in FIGS. 1 and 2, the panel 10 has a radial thickness (t) defined between its surfaces 14 and 20. The radial thickness of the panel 10 is not required to be uniform, and instead will typically vary in the axial direction, for example, as represented in FIG. 1.

According to a preferred aspect of the invention, the abradable panel 10 can be consistently produced to have a desired geometric shape, including complex geometric shapes within nonuniform thicknesses. Another preferred aspect is that the abradable panel 10 can be produced from a preform to have a near net-shape, such that minimal machining of the panel 10 is necessary prior to installation in the shroud assembly 12. As used herein, "near net-shape" refers to a shape that is substantially geometrically similar to a targeted shape for the panel 10, but may vary in size due to the shape varying nominally from the dimensions of the targeted shape. According to another preferred aspect of the invention, regions within the abradable panel 10 may have different densities. In FIG. 2, such differences are represented by first and second density zones 22 and 24, though the presence of additional zones is foreseeable. FIG. 2 represents these zones 22 and 24 as being delineated by a line 26 oriented in the circumferential direction of the panel 10, though other orientations are possible, for example, in the axial direction. Furthermore, as will be discussed in more detail below, an abrupt demarcation is not required nor necessarily desired. Instead, a density gradient may exist across the line 26 and extend well beyond the line 26 in either or both axial directions. Finally, the first density zone 22 is indicated as having a higher density than zone 24, though this particular relative placement of lower and higher densities within the panel 10 is not a requirement.

The ability to achieve different densities within different zones 22 and 24 of the panel 10 can be advantageous for the purpose of promoting one or more performance characteristics of the panel 10. For example, the densities within the zones 22 and 24, as well as the relative sizes and locations of the zones 22 and 24 within the panel 10, can be tailored to promote the erosion resistance of the panel 10. In particular, it may be desirable for the denser zone 22 to exhibit greater erosion resistance than the zone 24 if the denser zone 22 is located upstream of the zone 24, and optionally upstream of the blades 13, and is therefore more susceptible to direct impingement from particles entering the engine.

Abradable panels are commonly produced from polymer composite materials, and more particularly expandable and curable syntactic foam materials that contain a foaming (blowing) agent, nonlimiting examples of which include micro-balloons or micro-spheres that expand when heated. However, the use of expandable foam materials complicates the ability to achieve specific radial thicknesses (t) within the panel 10, as well as the ability to achieve different densities within the zones 22 and 24 of the panel 10. According to one aspect of the invention, an approach to controlling both the geometric shape and density within the panel 10 is to utilize a continuous forming process, such as of the types that can be performed by an extruder, a continuous kneader, or some other type of continuous forming apparatus, to produce a preform of the panel 10.

Figure 3:
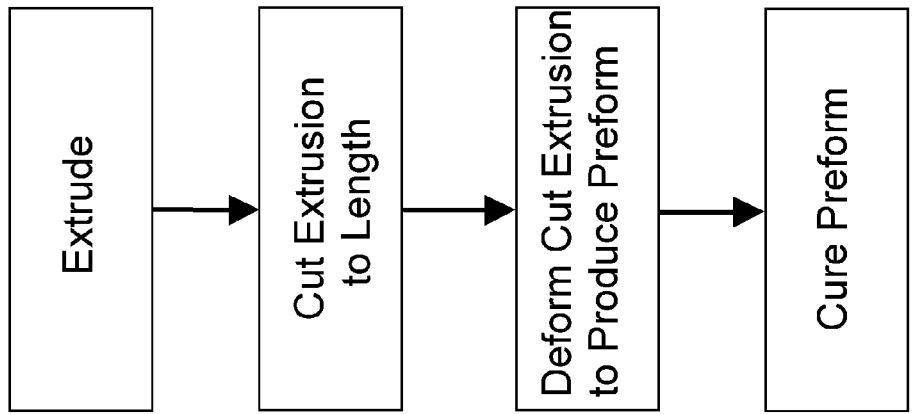
FIG. 3 represents steps that can be carried out to produce panels, including the abradable panel of FIGS. 1 and 2.

As a nonlimiting example, FIG. 3 schematically represents process steps for producing a panel 10 that include producing a preform for the panel 10 through the use of an extrusion process. More particularly, a suitable input material is extruded to form a continuous form (extrusion), which is typically cut to length before being deformed to produce a preform. The panel 10 is then produced by performing an appropriate cure on the preform for the particular input material. As a result of the extrusion process, it should be apparent that preforms can be produced to have a variety of geometric configurations. The extrusion, and therefore the portions cut from the extrusion, will have a constant cross-sectional shape transverse to the extrusion direction, though not necessarily a constant thickness throughout the cross-sectional shape. The pressing operation can be performed within a mold cavity to achieve the desired geometric shape for the preform. The curing operation is preferably performed in a second mold cavity having a restricted volume that, in preferred embodiments of the invention, allows the preform to expand to a final nonuniform thickness desired for the panel 10. Additionally, the restricted volume of the mold cavity can be sized so that expansion of one or more regions of the preform are limited, by which the restricted regions of the preform are able to produce, for example, the denser zone 22 within the panel 10. The mold used to cure the preform may be a closed mold, for example, a self-heated mold, rather than autoclave curing, though curing in an autoclave may be advantageous under certain circumstances.

While a variety of polymer-based materials could be used to produce the panel 10, preferred materials are, while uncured, shapeable, extrudable, and moldable, and in addition are capable of being formed into various complex geometrical shapes. For use in producing a panel 10 containing an abradable material suitable for an abradable seal, particularly notable materials are epoxy-based resin systems combined with catalysts (curatives/accelerants), fillers and fibers that contribute mechanical properties, and further combined with one or more foaming agents to yield an expandable foam material that can be expanded through the application of a thermal treatment. Particularly suitable constituents for an epoxy-based resin system include, but are not limited to, diglycidyl ether of bisphenol A epoxy resins (commercial examples of which include EPON® 830 and EPON® 1002F, available from Momentive Specialty Chemicals), bisphenol A (BPA), functionalized polybutadiene (a commercial example of which is RICON® 130MA13, available from Cray Valley SA), dihydroxynaphthalene (DHN), and polyoxyalkyleneamines (commercial examples of which include Jeffamine® T-5000 available from Huntsman Corporation). Particularly suitable catalysts include solid curatives such as dicyandiamide (DICY), tertiary amine salts (a commercial example of which is Amicure® UR2T, available from Air Products and Chemicals, Inc.), and similar catalysts suitable for curing epoxy resin systems. Suitable fillers include, but are not limited to, carbon powders, and suitable fiber reinforcement materials include, but are not limited to, polyetheretherketone (PEEK), polyimides, polyamides (for example, nylon), polyethersulfones, etc. Suitable foaming agents include, but are not limited to, isobutane encapsulated in an acrylic copolymer (a commercial example of which is Expancel® 091 DU 80 micro-spheres, commercially available from Akzo Nobel). Other desirable constituents for the epoxy-based resin system include hardeners, such as DYHARD S100 commercially available from AlzChem AG.

Figure 4:
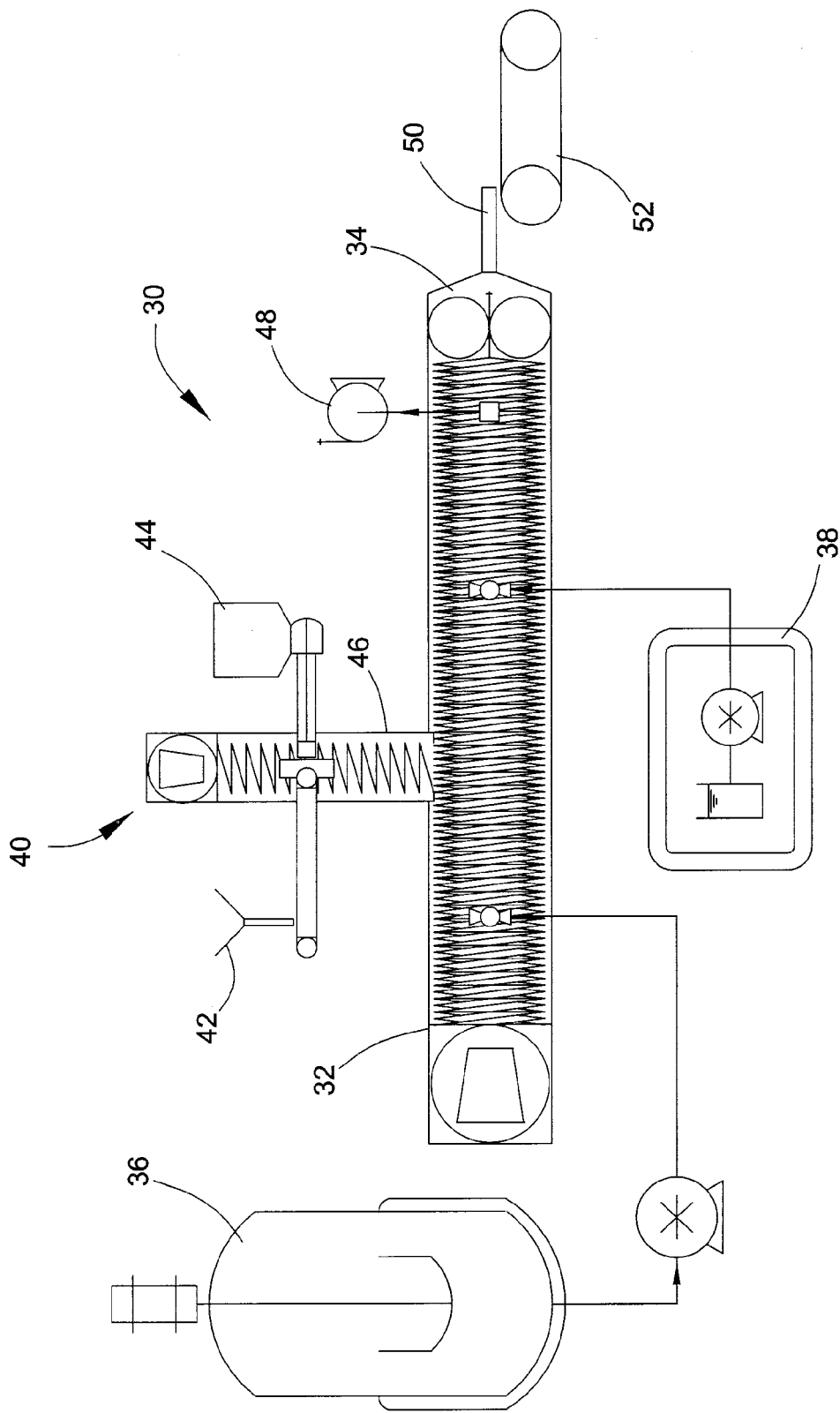
FIG. 4 schematically represents an extrusion apparatus suitable for producing a continuous form that can be processed to produce the panel of FIGS. 1 and 2.

FIG. 4 schematically represents an extruder system 30 as a type of continuous forming apparatus that can be used to produce preforms for the abradable panels 10 of FIGS. 1 and 2. The extruder system 30 is represented in FIG. 4 as including a co-rotating intermeshing twin screw extruder 32 within which the constituents of the expandable foam material can be continuously compounded to form a partially-cured compounded polymeric material, which is effectively the expandable foam material. The compounded polymeric material then exits the extruder 32 through an extrusion die 34. Liquid constituents of the expandable foam material, for example, the resin system, can be pre-mixed in a liquid mixing tank 36 prior to being delivered to the extruder 32. The tank 36 may incorporate any suitable type of mixer, for example, a Ross mixer or similar batch kettle. As a nonlimiting example, the epoxy and phenol constituents of the foam material can be mixed at an elevated temperature (for example, about 110° C.), and then cooled (for example about 75 to 80° C.) prior to being delivered to the extruder 32. Though FIG. 4 represents the liquid constituents mixed within the tank 36 as being immediately delivered to the extruder 32, the constituents could be packaged for storage and/or shipment for subsequent processing. However, premature curing of the foam material may occur when reheating the material for delivery to the extruder 32.

From FIG. 4, it should be apparent that each constituent or certain combinations of constituents could be separately delivered to the extruder 32. To prevent reactions from prematurely occurring within the mixing tank 36, the extruder system 30 is preferably provided with at least one separate delivery system for delivering additional constituents of the foam material downstream from where the contents of the tank 36 are introduced into the extruder 12. As an example, a separate delivery system 38 is represented as a tank 38 for delivering one or more additional liquid constituents, for example, a functionalized polybutadiene, to the extruder 32, to prevent a premature reaction between the functionalized polybutadiene and other liquid constituents of the resin system within the mixing tank 36, for example, polyoxyalkyleneamine. FIG. 4 further represents another separate delivery system 40 configured for delivering multiple solid constituents of the expandable foam material to the extruder 32 at a location between the locations at which the liquid constituents are introduced. The solid constituents, which may include one or more solid catalysts, one or more foaming agents, and one or more filler and/or fiber materials, are represented as being held in hoppers 42 and 44 and then fed to the extruder 32 through a mechanical device 46 capable of introducing controlled amounts of the solid constituents. The extruder system 30 is further represented as including a vacuum pump 48, which can be used to withdraw residual air trapped during the compounding process. At the downstream end of the extruder 32, the expandable foam material is extruded through the extrusion die 34 to form a continuous form (extrusion) 50, which is deposited onto a conveyor 52 or other suitable transport device.

In view of the above, the extruder 32 serves to compound the various resin and solid constituents of the expandable foam material, as well as generate at least an initial cross-sectional shape from which a preform for the panel 10 can be formed. The extrusion die 34 can generate the pre-cure dimensions required for the preform or a near net-shape for the panel 10 if a constant cross-sectional shape is desired, or the preform can undergo a forming operation if the panel 10 is required to have a geometric shape whose cross-sectional shape differs from the cross-sectional shape of the extrusion produced by the extrusion die 34. As an example, the process represented in FIG. 3 includes a deformation step that occurs subsequent to extrusion. The deformation step can be performed to produce a preform having a non-constant cross-sectional shape, including a thickness that is not constant.

As a nonlimiting example of a suitable deformation process, FIG. 5 schematically represents a pressing apparatus 54 as including a mold 56 comprising mold halves 58 that together define a mold cavity 60 configured to produce a desired shape for a preform 62 of the panel 10. The desired shape of the preform 62 may include a cross-sectional shape that is different than that of the extrusion 50 from which the preform 62 is formed. This difference may be in the cross-sectional shape of the preform 62 parallel or transverse to the extrusion direction of the extrusion 50. While the preform 62 is represented as being formed by a pressing operation, other methods of generating the desired geometric shape of the preform 62 are also within the scope of the invention.

Whether or not the production of the preform 62 includes a forming step following the extrusion process, the preform 62 is capable of having more uniform dimensions and composition, resulting in improved raw material yield with less scrap and trimming. In addition, the panel 10 produced from the preform 62 is capable of having a more controllable density than is possible with preforms produced by stacking planar plies of the foam material. For example, the panel 10 can be produced to have a uniform density or a variable density in which a density gradient is present within the panel 10, as opposed to step changes in the density of a panel produced from a preform formed of stacked plies. As an example, FIG. 6 schematically represents a mold 64 within which the preform 62 can be cured. The mold 64 has a mold cavity defined by complementary cavities 66 defined in opposing surfaces of two mold halves 68. The complementary mold cavities 66 cooperate to limit the expansion of the expandable foam material of the preform 62 during curing, so that a near net-shape for the panel 10 can be produced. In so doing, the requirement for machining, grinding and other post-cure operations can be minimized.

As a particular example, the surfaces of the complementary cavities 66 can be contoured to produce the desired thickness (t) of the panel 10 and the contoured profile desired for the abradable surface 14 of the panel 10. The cavities 66 define a restricted volume in which the expandable foam material of the preform 62 is able to expand during curing and, in doing so, not only defines the near net-shape profile for the panel 10, but also affects the density profile of the panel 10 produced in the mold 64 from the preform 62. As an example, the mold cavity can be sized such that a thinner section 62A of the preform 62 within one region 70A of the mold cavity is allowed to expand more than a thicker section 62B of the preform 62 within another region 70B of the mold cavity, with the result that the zone 24 of the panel 10 produced from the thinner section 62A will have a lower density than the zone 22 of the panel 10 produced from the thicker section 62B. It is also possible to influence the density within the panel 10 by operating the mold 56 to thermally create or modify a density gradient within the preform 62. For example, one of the mold halves 58 can be heated more rapidly and/or held at a higher temperature than the other half 58 so that the foaming agent within the portion of the preform 62 adjacent the hotter mold half 58 reacts and expands before than the foaming agent within the portion of the preform 62 adjacent the cooler mold half 58.

Production of preforms by extrusion (or another continuous forming process) also have the advantage of improved through-thickness homogeneity within the preform 62 and panel 10, as a result of the preform 62 being free of gaps, wrinkles, etc., that can occur with preforms formed of stacked plies. The extruded preform 62 is also less susceptible to contamination and foreign object damage (FOD) that can be introduced during handling of plies, and can be produced to have a lower surface area as compared to stacked plies. The preform 62 can also provide a more manageable green material for mass placement. The preform 62 can also be produced to have in-situ texturing that reduces contact with the surfaces of the mold cavities 66. Finally, the mold cavity 66 that defines the surface 20 of the panel 10 can be provided with ribs 72 (FIG. 6) or other surface features capable of producing flow channels 74 in the surface 20 of the panel 10 (FIG. 2) to promote the flow of adhesive during bonding of the panel 10 to its support structure 16.

While the above describes the preform 62 as being produced to have a sufficient thickness to produce a panel 10, it is also within the scope of the invention that multiple preforms 62 produced in the manner described above could be stacked to produce a panel 10. For example, relatively thin preforms 62 could be laid-up in a predetermined pattern to produce a green preform that can subsequently be cured in a mold.

While the invention has been described in terms of specific embodiments, it is apparent that other forms could be adopted by one skilled in the art. For example, the physical configuration of the panel 10, shroud assembly 12, and preform 62 could differ from that shown, and materials and processes other than those noted could be used. Therefore, the scope of the invention is to be limited only by the following claims.

The invention claimed is:

1. A process for producing a panel, the process comprising:
introducing constituents of an expandable foam material into a continuous forming apparatus that continuously compounds the constituents into a partially-cured compounded polymeric material;
continuously forming the compounded polymeric material with the continuous forming apparatus to produce a continuous form having a constant cross-sectional shape transverse to a continuous forming direction of the continuous forming apparatus;
deforming a portion of the continuous form to produce a preform; and then
curing the preform within a restricted volume to cause the preform to expand and produce the panel.

2. The process according to claim 1, wherein the preform has a different cross-sectional shape than the continuous form.

3. The process according to claim 1, wherein the restricted volume causes zones of the panel to have different densities.

4. The process according to claim 1, wherein the restricted volume causes zones of the panel to have different densities and thicknesses.

5. The process according to claim 1, wherein the continuous forming apparatus is an extrusion apparatus.

6. The process according to claim 5, wherein the constituents of the expandable foam material comprise liquid and solid constituents that are combined within the extrusion apparatus.

7. The process according to claim 1, wherein the deforming step is performed in a mold.

8. The process according to claim 1, wherein the curing step is performed in a mold and the restricted volume is a mold cavity within the mold.

9. The process according to claim 1, wherein the panel is an abradable panel.

10. The process according to claim 9, further comprising installing the abradable panel as part of a shroud assembly in a fan section of a turbofan engine.

11. A process for producing abradable panels adapted to be assembled together to form an abradable seal in a fan section of a turbofan engine, the process comprising:
- introducing constituents of an expandable foam material into an extrusion apparatus that continuously compounds the constituents into a partially-cured compounded polymeric material;
- continuously forming the compounded polymeric material with the extrusion apparatus to produce a continuous form having a constant cross-sectional shape transverse to a continuous forming direction of the extrusion apparatus;
- deforming a portion of the continuous form to produce a preform that has a different cross-sectional shape than the continuous form; and then
- curing the preform within a restricted volume to cause the preform to expand and produce the panel, the restricted volume causing at least two zones of the panel to have different densities.

12. The process according to claim 11, wherein the restricted volume causes zones of the panel to have different densities and thicknesses.

13. The process according to claim 11, wherein the constituents of the expandable foam material comprise liquid and solid constituents that are combined within the extrusion apparatus.

14. The process according to claim 11, wherein the deforming step is performed in a mold.

15. The process according to claim 11, wherein the curing step is performed in a mold and the restricted volume is a mold cavity within the mold.

16. The process according to claim 11, wherein the constituents of the expandable foam material comprise an epoxy resin system, polybutadiene, at least one fiber material, and at least one foaming agent.

17. The process according to claim 11, further comprising installing the abradable panel as part of a shroud assembly in a fan section of a turbofan engine.

18. A process for producing abradable panels adapted to be assembled together to form an abradable seal in a fan section of a turbofan engine, the process comprising:
- introducing constituents of an expandable foam material into an extrusion apparatus that continuously compounds the constituents into a partially-cured compounded polymeric material;
- continuously forming the compounded polymeric material with the extrusion apparatus to produce a continuous form having a constant cross-sectional shape transverse to a continuous forming direction of the extrusion apparatus;
- deforming a portion of the continuous form to produce a preform that has a different cross-sectional shape than the continuous form; and then
- curing the preform within a restricted volume to cause the preform to expand and produce the panel, the restricted volume causing at least two zones of the panel to have different densities;
- wherein the curing step is performed in a mold and the restricted volume is a mold cavity within the mold; and
- wherein the mold cavity is sized such that a thinner section of the preform expands more than a thicker section of the preform, with the result that a first zone of the panel is produced from the thinner section to have a lower density than a second zone of the panel produced from the thicker section.

* * * * *